United States Patent [19] [11] 3,769,467
Gabor [45] Oct. 30, 1973

[54] VIBRATION DAMPED TRANSDUCER HEAD ASSEMBLY

[75] Inventor: Andrew Gabor, Danville, Calif.

[73] Assignee: Diablo Systems, Incorporated, Hayward, Calif.

[22] Filed: Feb. 14, 1972

[21] Appl. No.: 226,032

[52] U.S. Cl. .................. 179/100.2 CA, 340/174.1 F
[51] Int. Cl. .......................... G11b 5/56, G11b 25/04
[58] Field of Search ............ 179/100.2 CA, 100.2 T, 179/100.2 MD, 100.2 P; 340/174.1 F, 174.1 J, 174.1 C, 174.1 E; 346/74 M; 29/603; 178/6.6 DD, 6.6 A; 310/12, 13, 14, 27

[56] References Cited

UNITED STATES PATENTS 3,668,443 6/1972 Schwartz .............................. 310/12
3,260,870 7/1966 Beach, Jr. et al. ........ 179/100.2 CA
3,666,977 5/1972 Helms et al. ................. 340/174.1 C
3,576,450 4/1971 Beach, Jr. et al. ........... 340/174.1 C
3,643,242 2/1972 Bryer .......................... 340/174.1 C

OTHER PUBLICATIONS

IBM Technical Disclosure Bulletin, Rynders et al., Damped Slider Mount, Vol. 11, No. 3, Aug. 1968, page 248.

*Primary Examiner*—Vincent P. Canney
*Assistant Examiner*—Alfred H. Eddleman
*Attorney*—Paul D. Flehr et al.

[57] ABSTRACT

A vibration damped transducer head assembly where the head is cantilevered from a movable carriage and includes an elongated overhanging weight of metal which is affixed to the transducer head by energy absorbing material.

6 Claims, 3 Drawing Figures

VIBRATION DAMPED TRANSDUCER HEAD ASSEMBLY

BACKGROUND OF THE INVENTION

The present invention is directed to a vibration damped transducer head assembly and more particularly to a transducer assembly for use with magnetic disk drive units.

The spacing of a transducer or pickup head from a fixed scale is very critical, especially where the information is used in a servo system. If the transducer head is used in a high speed non-continuous system the resultant high acceleration and deceleration forces may cause significant movement or vibration. Such is the case where the transducer head is part of a servo system for positioning the read/write heads of a magnetic disk drive unit over an appropriate recording track.

One obvious solution is the placement of wheels on the transducer head which roll in a fixed track. This will, however, produce wear and noise especially at high speed operating cycles.

OBJECTS AND SUMMARY OF THE INVENTION

It is, therefore, an object of the invention to provide an improved vibration damped transducer head assembly.

In accordance with the above object there is provided a vibration damped transducer head assembly comprising a fixed linear scale. The transducer head is spaced from the scale a nominally fixed distance and movable over the scale. A movable carriage has a cantilevered arm extending therefrom for supporting the head at the fixed distance. Means for damping vibration of the head due to to and fro movements of the carriage include a mass of relatively dense material and a sheet of energy absorbing material for coupling the mass to said head.

DETAILED DESCRIPTION OF THE PREFERRED EMBODIMENT

Figure 1:
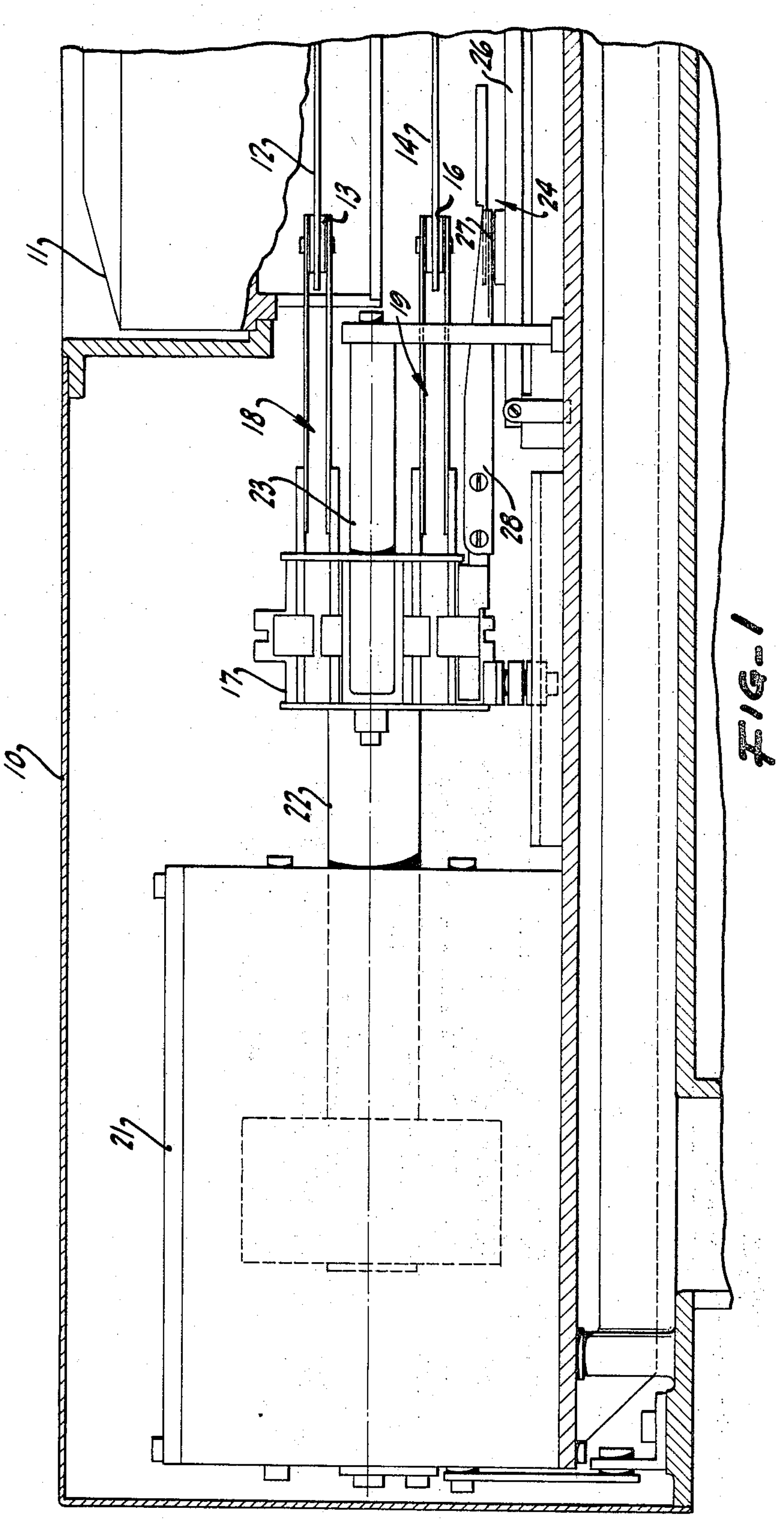
FIG. 1 is an elevation view partially in section of a transducer head assembly embodying the present invention in the context of a magnetic disk drive unit.

FIG. 1 illustrates a housing 10 which contains a magnetic disk memory 11 or cartridge drive unit only a portion of which is shown. Cartridge 11 includes a magnetic memory platter or disk 12 which is written on and read from by a pair of removable read/write heads 13. The housing 10 also includes a fixed memory platter or disk 14 which has a pair of read/write heads 16. These heads are positionable over any one of a plurality of memory tracks on the platters. Heads 13 and 16 are both coupled to a movable carriage 17 by steel support finger pairs 18 and 19.

Carriage 17 is moved by what is termed a voice coil or moving coil motor 21. Details of such motors are disclosed in a copending application entitled "Voice Coil Motor With No Stray Flux," Ser. No. 226,139, filed Feb. 14, 1972 in the name of Andrew Gabor and assigned to the present assignee. In general, the moving coil motor includes a moving armature 22 which is coupled to carriage 17 the armature being slidable on a fixed rod 23. The remainder of the moving coil motor includes a permanent magnet and wound coil which is part of the armature and is driven by a servo system.

The servo system to control the linear moving coil motor 21 includes a transducer 24 having a fixed linear scale 26 of rectangular configuration and a movable pickup head or transducer head 27 which is mounted by a steel finger or arm 28 to carriage 17. In other words, head 27 is cantilevered from carriage 17 by arm 28. In general, the transducer scale 26 and pickup head 27 includes a plurality of substantially parallel conductors on their surfaces. Its operation and construction in the servo system is almost identical to the circular transducer illustrated in copending application Ser. No. 157,283 filed June 28, 1971 entitled "Apparatus for the Measurement of Relative Velocity Between Two Relatively Movable Members" in the name of Andrew Gabor and assigned to the present assignee. The technique for bringing the read/write heads of the magnetic disk unit to a stop over a predetermined track using the foregoing control system is also disclosed and claimed in application Ser. No. 71,984 filed Sept. 14, 1970 in the name of Andrew Gabor entitled "Apparatus for Controlling the Relative Position Between Two Relatively Movable Members," and also assigned to the present assignee and now U.S. Pat. No. 3,663,880 granted May 16, 1972. This patent discloses that the external reference position signal applied to the control system is a difference count indicating to the control system the number of tracks it must pass over to the next stopping point.

Figure 3:
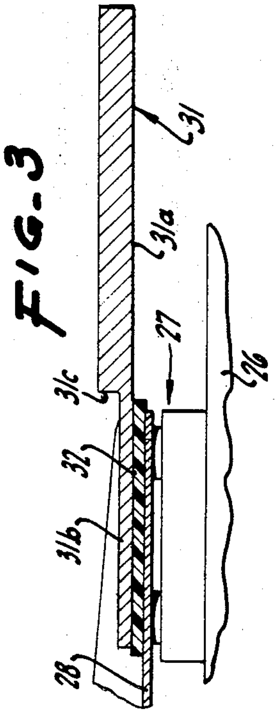
FIG. 3 is an enlarged cross-sectional view taken along line 3—3 of FIG. 2.

FIG. 3 illustrates in greater detail the transducer head assembly 27 and illustrates how it is maintained a nominally fixed distance from the fixed scale 26. This distance must not vary considerably or else the servo system will not operate effectively and, for example, may stop a read/write head at an improper track. Because of the cantilevered nature of the transducer head 27 it is very susceptible to vibration caused by the to and fro movement of the carriage 17. However, this cantilevering is necessary in order to place pickup head 27 in the same vertical plane as the read/write heads 13 and 16 to provide for temperature compensation. Such temperature compensation is disclosed and claimed in copending application Ser. No. 198,882 filed Nov. 15, 1971, entitled "Temperature Compensation System for Magnetic Disk Memory Unit," in the name of Andrew Gabor and assigned to the present assignee and now U.S. Pat. No. 3,723,980 granted Mar. 27, 1973.

Figure 2:
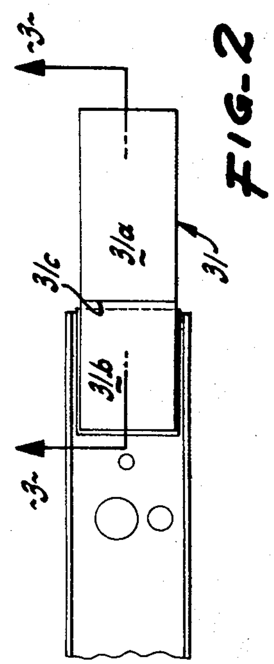
FIG. 2 is an enlarged plan view of a portion of FIG. 1.

In order to damp vibration of the transducer head 27 there is provided, as clearly illustrated in FIGS. 2 and 3, a mass 31 composed of relatively dense material such as non-magnetic stainless steel. Such mass is elongated in form as clearly illustrated in FIG. 2 with the majority of the mass overhanging the transducer head 27 in a direction away from carriage 17 and in line with the to and fro movements from the carriage and the head itself. This overhanging portion indicated as 31*a* is relatively more effective in accordance with mechanical lever principles of weight times lever arm. The effect of the overhanging portion 31*a* is also accentuated by the fact that the cross-section of this portion is greater than the cross-section of portion 31*b* because of the step 31*c*. Mass 31 is attached to the arm 28 at the location of the transducer head on the arm by a sheet 32 of energy absorbing material. More specifically, the portion 31_b_ of mass 31 is adhered to this sheet by a rubber base adhesive and energy absorbing material 32 is in turn adhered to the end of arm 28 by the same rubber base adhesive.

Energy absorbing material 32 is sold by Norton Research Corporation under the trademark "E-A-R." The material is of the type in which the more rapid the deforming impulse which maybe applied to the material, the lossier the material becomes. Thus, each material serves to damp out any vibration set up in arm 28 and head 27. But at the same time, the lossy characteristic of the material prevents any significant resonance being set up due to a mass and spring effect.

Moreover, because of the leverage achieved in some part by the overhanging portion 31_a_ and the mounting of the mass at the transducer head portion or the end of arm 28, a relatively small mass or weight may be used. For example, in the present invention, the mass 31 has a weight of approximately 17 grams compared to the overall weight of cantilevered arm 28 and the transducer head 27 of substantially 50 grams. It is believed that if these two weights are of substantially the same order of magnitude, then effective damping will be provided. On the other hand, while a greater weight would provide more effective damping, this would defeat the ability of carriage 17 and the read/write heads 13 and 16 to effectively accelerate and decelerate. In other words, in the ideal system it is desired that a minimum movable weight be driven by the voice coil motor 21.

Typical dimensions used in the present invention with the foregoing weights where the arm 28 has a cantilevered length of substantially 3¾ inches for mass 31 are a length of approximately 2 3/16 inches, a width of approximately ⅜ inches and a thickness at the overhanging portion 31_a_ of approximately ⅛ inch.

Thus, an improved vibration damped transducer head assembly has been provided.

I claim:

1. A vibration damped transducer head assembly comprising: a fixed linear scale, a transducer head spaced from said scale a nominally fixed distance and movable over said scale; a movable carriage having a canti-levered arm extending therefrom for supporting said head at said fixed distance; means for damping vibration of said head due to to and fro movements of said carriage including a mass of relatively dense material the majority of such mass overhanging said head in a direction away from said carriage and in line with said to and fro movements and including a sheet of energy absorbing material for coupling said mass to said head.

2. An assembly as in claim 1 where said mass is composed exclusively of metal in an elongated form.

3. An assembly as in claim 1 where said energy absorbing material is of the type which the more rapid the deforming impulse which may be applied to the material the lossier the material becomes.

4. An assembly as in claim 1 where said mass has a weight of the same order of magnitude as said cantilevered arm and said transducer head together.

5. An assembly as in claim 1 where the overhanging portion of said mass is thickner in cross-section relative to the remainder of the mass.

6. An assembly as in claim 1 where said carriage also includes read/write heads cantilevered therefrom for sensing a magnetic memory disk, said read/write heads being located in the same vertical plane with respect to the horizontal to and fro movements, as said transducer head.

* * * * *